Aug. 4, 1931.  C. H. GAGEN  1,816,836
PROCESS FOR CLEANING AND COATING AIR FILTERS
Filed April 21, 1927
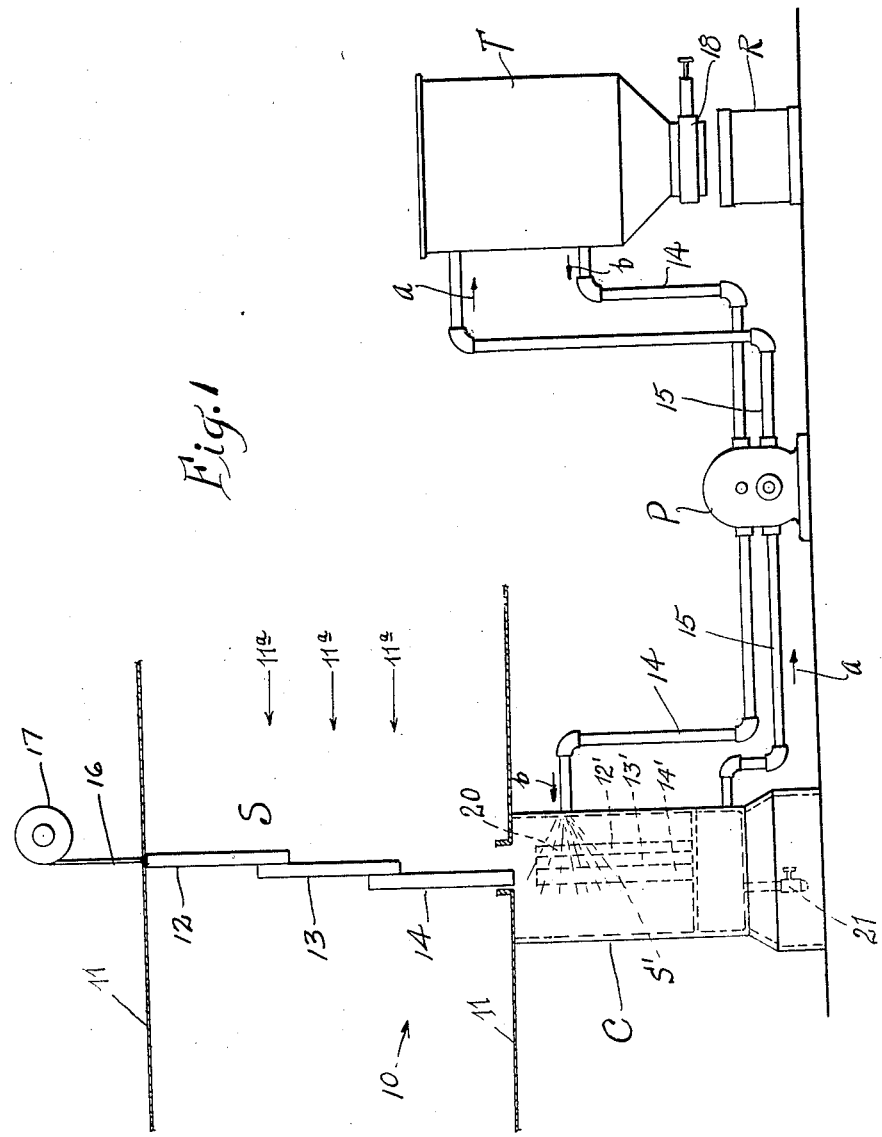
Charles H. Gagen,
Inventor,
By his Attorney Julius Wittal Patented Aug. 4, 1931

1,816,836

UNITED STATES PATENT OFFICE

CHARLES H. GAGEN, OF NEW YORK, N. Y., ASSIGNOR, BY MESNE ASSIGNMENTS, TO AMERICAN AIR FILTER COMPANY, INC., OF LOUISVILLE, KENTUCKY, A CORPORATION OF DELAWARE

PROCESS FOR CLEANING AND COATING AIR FILTERS

Application filed April 21, 1927. Serial No. 185,644.

This invention relates to processes for filtering or purifying air, and particularly to the cleansing of the filter.

One object of this invention is to provide a process for cleansing an air or gas filter in an improved and expeditious manner with the employment of as little manual effort as possible, and the consequent elimination of the human element.

A further object of this invention is to provide a process comprising an improved method of cleansing the air filtering means in a simple, efficient and expeditious manner to permit said process to be performed with uniform and constant efficiency of a high degree.

Still another object of this invention is to provide a process comprising an improved method of cleansing the filter of an air filtering machine wherein an oleaginous substance is used on said filter to increase the effectiveness thereof, said method including using a bath spray or current of said substance or of any other suitable liquid medium to remove foreign matter deposited on the filter and cleansing said liquid medium by sedimentation preferably in a separate tank or reservoir (especially if of the same medium as used for coating the filter) for further use in the process.

Other objects of this invention will in part be obvious and in part hereinafter pointed out.

The invention accordingly consists in the features of operation, and their order and cooperation which will be exemplified in the following description, and of which the scope of application will be indicated in the appended claims.

In the accompanying drawing, in which is shown one of the various possible illustrative embodiments for the practice of this invention, Fig. 1 is a diagrammatic elevational view showing an air filtering system on which the novel process is particularly adapted to be used.

Referring in detail to the drawing, 10 denotes an air filtering machine of any type or kind and of which one embodiment is specifically described in my copending application Serial No. 179,128 filed March 28, 1927.

Said machine comprises an air filter or screen S for filtering dust and other foreign matter from air passed through the screen by means of a duct, or the like, indicated at 11, having a flow of air, as at 11a. A liquid container C is disposed beneath the screen S adjoining the same in an air-tight manner (not shown), and said container may be filled with an oleaginous or other appropriate liquid substance to coat the screen with a dust removing film of said substance when the screen is lowered into said container for which means may be provided. Any conventional means, including a chain 16 and drum 17, may be utilized to lower the screen, as described in full detail in connection with the construction of the screen, the subject matter of my copending application, as aforesaid.

Preferably the screen is collapsible to be entirely received within the container C, as shown by the dotted lines at S1, and includes for this purpose a plurality of relatively slidable screen sections 12, 13 and 14, that are positioned in side by side relation, as at $12^1$, $13^1$ and $14^1$, when said screen is lowered into the container. Hook members, shown in said copending application, detachably engage the screen sections together when the screen is raised, an upper section supporting the next adjacent lower section and detaching the same when the screen is lowered. Suitable guide and sealing means provide for uniform movement of the screen sections and for the operation of the parts as aforementioned.

The installation is completed by providing a pump P, a settling tank T and a sediment receptacle R, all of which are properly interconnected with container C by means of pipes 14 and 15, as will be stated more in detail in the following description of the novel process.

To start operation of the air filtering machine, the container C is first filled with a viscous or oleaginous liquid and the screen S is lowered thereinto, in collapsed position, to coat the same with a dust gathering film of liquid. The screen is then raised into elevated position and air to be filtered is passed therethrough.

To eliminate the danger of the oleaginous liquid catching fire through exposure in the container C and for clarification and sedimentation, said oil is drawn off into a closed storage and settling tank T. For this purpose, the pump P, which is of any appropriate conventional construction and, therefore, not shown in detail, causes the liquid to flow through pipes 15 in the direction of arrow a.

After the screen has gathered a predetermined quantity of dust from the air, and the efficiency of air filtering has begun to drop, the screen S is lowered into and collapsed in said container C, into which the oleaginous liquid has been returned, preferably by gravity or by the same pump P, which for this form of arrangement may be of any of the well known reversible or double acting pump type, the liquid flowing this time through pipes 14 as shown by arrows b. The dust and other foreign matter is then efficiently removed in a novel way from the screen by the action of the liquid on the foreign matter, and the screen is again coated with a fresh dust gathering film.

The screen is now raised into operative position and the liquid again removed by pump P through pipes 15 into the tank T, which now operates as a settling tank to cause the foreign matter in the liquid to settle out. This permits the oil to be used repeatedly, and is therefore economical. Moreover, the oil is, in this way, removed to a relatively remote and safe tank, and fire hazard diminished. A valve 18 is provided at the base of the settling tank to permit the sediment to drop into the receptacle R, from which it may be removed from time to time, while the liquid is in the container C.

In this way, the machine can always be kept operating efficiently.

It is obvious that two pumps may be used instead of the one reversible or double acting pump shown, and even two different liquid mediums may be employed in connection with my novel process, one for cleaning the filters or screens and for removing the dirt, dust, etc., therefrom, and a second liquid to again coat the same for new efficient operation. In this latter case, separate pumps and tanks will have to be provided for the different liquids.

So, also, various methods may be employed in the actual cleaning of the air filters or screens. They may simply be permitted to rest in the cleaning liquid and the dirt on them dissolved by its action, or they may be moved to and fro therein, one method of which is described in my copending mentioned application, or the cleaning fluid may be thrown on and through the screens with appropriate force and in a diffused form, as shown at 20 in the drawing, etc. Part of the removed dirt may be eliminated right from the wash-tank through an appropriate valve and pipe line at the bottom thereof, as at 21.

I desire to remark that the principle of my process for filtering air and particularly cleansing an air filter may also be used in such a manner that the filter or screen element remains in place and a current or spray of the cleansing and coating fluid is applied thereto without removing the same. The fluid is then collected in a receptacle below the filter as before and all the further operations of removing, storing, settling or clarifying, and returning the liquid are gone through in a similar manner as described hereinbefore.

It is also apparent that instead of using a filter made up of collapsible sections, one of a single unit may be used, located above the container C and which may or may not be lowered into the said container when a spray or stream of the liquid is directed upon said filter or screen.

It is thus seen that there is provided a process in which the several objects of this invention are achieved, and which is well adapted to meet the conditions of practical use.

As various further changes might be made in the process above set forth, it is to be understood that all matter herein set forth or shown in the accompanying drawing is to be interpreted as illustrative only, and not in a limiting sense.

I, however, still want to emphasize one, otherwise quite obvious change in the construction of the means employed in practicing the process the subject matter of my present invention, as against the means shown in my copending application, referred to hereinabove. The sections or units 12, 13, 14, etc., of the collapsible filter may naturally also be made independent of each other, and may be lowered into a suitable bath or raised therefrom independently and not each being caught and raised by the next one above it as described. In both methods of construction the individual units of the screen may be counterbalanced for obvious reasons and by any of the usual ways and methods, well known in the arts, and particularly used in connection with window sashes.

I claim:

1. An apparatus for cleaning and recoating air filters, comprising a collapsible air filter, a receptacle for said filter when in a collapsed position, means to fill said receptacle with a bath of a suitable liquid, means to collapse said filter into said bath and to again remove it from said receptacle into operative position.

2. In an apparatus as set forth in claim 1, a separate settling tank, means to draw said liquid from said receptacle into said tank for storing and clarifying the same therein and means to return the clarified liquid to said receptacle.

3. A method of cleansing and recoating air filters, consisting in providing an air filter made of collapsible sections and a receptacle for said sections when in a collapsed position, collapsing said filter into said receptacle, applying a stream of cleaning and coating liquid to said filter and again removing it from said receptacle into operative position.

4. A method of cleaning and coating air filters which includes intermittently immersing the whole body of the air filter in a bath of liquid to clean and coat said filter and withdrawing the whole body of the filter from said bath and interposing the same in filtering relation to an air stream, and intermittently drawing off the liquid into a settling tank to remove foreign matter therefrom and permit the liquid to be used again for cleaning and coating the filter.

5. A method of cleaning and coating air filters which includes intermittently immersing the whole body of the air filter while in collapsed condition in a bath of liquid to clean and coat said filter and withdrawing the whole body of the filter from said bath and interposing the same in extended condition and in filtering relation to an air stream.

6. Air filtering apparatus comprising a filter member, means for removably retaining the same in the path of a current of air, a container for a supply of cleaning liquid, means for advancing said filter member into said container and for withdrawing said member therefrom, a settling tank for the used liquid, means for admitting a supply of liquid to said container, means for withdrawing used liquid therefrom, both of said last named means being operatively connected to said settling tank.

Signed at New York, in the county and State of New York, this 28th day of March, 1927.

CHARLES H. GAGEN.